United States Patent [19]

Rabito et al.

[11] Patent Number: 4,552,934
[45] Date of Patent: Nov. 12, 1985

[54] SAG RESISTANT AT ESSENTIALLY 1:1 RATIO TWO COMPONENT ADHESIVE

[75] Inventors: Thomas G. Rabito; Richard L. Cline, both of Ashland; Stephen M. Oswalt, Mansfield; Marvin T. Randleman, New London; Michael E. Kimball, Ashland, all of Ohio

[73] Assignee: Ashland Oil, Inc., Ashland, Ky.

[21] Appl. No.: 251,458

[22] Filed: Apr. 6, 1981

[51] Int. Cl.$^4$ .............................................. C08L 75/08
[52] U.S. Cl. ..................................... 525/458; 525/459; 524/451; 528/59; 528/67
[58] Field of Search ............... 525/457, 458, 459, 440; 528/59, 67; 252/182

[56] References Cited

U.S. PATENT DOCUMENTS

| | | | |
|---|---|---|---|
| 3,284,539 | 11/1966 | McElroy | 525/440 |
| 3,392,148 | 7/1968 | Zech et al. | 525/457 |
| 3,663,513 | 5/1972 | Kazama et al. | 525/440 |
| 3,666,835 | 5/1972 | Schloss | 525/458 |
| 3,711,571 | 1/1973 | Farah | 525/458 |
| 3,730,927 | 5/1973 | Schloss | 525/458 |
| 3,829,533 | 8/1974 | Matsui et al. | 525/458 |

*Primary Examiner*—John C. Bleutge
*Assistant Examiner*—Robert E. L. Sellers, II

[57] ABSTRACT

Improved two component adhesives allowing the components to be mixed at essentially a 1:1 ratio, giving excellent sag resistance, low viscosity, excellent handling ability and satisfactory gel time, said adhesives being composed of a prepolymer composition and a curative composition that can be mixed preferably at 1:2 to 2:1 ratio and a curative composition composed of a mixture of a reaction product of a multiple hydroxyl polyol of relatively low equivalent weight with a small amount of an organic polyisocyanate and a polyamine.

11 Claims, No Drawings

SAG RESISTANT AT ESSENTIALLY 1:1 RATIO TWO COMPONENT ADHESIVE

TECHNICAL FIELD

This invention relates to an improvement in two component adhesives that allows the components to be mixed at essentially a 1:1 ratio and gives excellent sag resistance, low viscosity, excellent handling ability and satisfactory gel time. More particularly this invention relates to a two component adhesive composed of a prepolymer composition and a curative composition that can be mixed preferably at 1:2 to 2:1 ratio and a curative composition composed of a mixture of a reaction product of a multiple hydroxyl polyol of relatively low equivalent weight with a small amount of an organic polyisocyanate and a polyamine.

BACKGROUND

The prior art two component adhesives composed of a prepolymer component and a curative component usually have been mixed at ratios of at least 4:1, and in many instances much higher. Also because the two components are mixed at such relatively high ratios those of ordinary skill in the art have used fillers to aid in controlling the ratio and to control sag resistance but this technique resulted in the physical properties of the adhesives varying in proportion to the fillers added to the adhesive.

DISCLOSURE AND PRACTICE OF THE INVENTION

This invention provides a two component sag resistant adhesive when the components are mixed at 1:2 to 2:1 ratio with a gel time of 2 to 120 minutes at 24° C., relatively low viscosity and good bonding ability to metal and polyester substrates, said components being composed of a polyurethane prepolymer composition having 3 to 15 percent and preferably 7 to 10 percent free NCO on a weight basis and a curative component composed of a mixture of 0.1 to 1.0 equivalents of a hydroxyl terminated prepolymer formed by reacting 0.1 to 1.5 equivalents of 150 to 3000 molecular weight polyol having two, and preferably three to six, hydroxyls with 0.1 to 0.4 equivalents of an organic polyisocyanate and 0.01 to 0.1 equivalents of a polyamine, preferably one that develops a turbidity in the hot methylene chloride test with the isocyanate of the prepolymer within 30 seconds.

The prepolymer composition component is made in the well known manner such as described in the Newell R. Bender and William M. Larson U.S. Pat. Nos. 3,812,003 issued May 21, 1974 and 3,935,051 issued Jan. 27, 1976 where about 100 parts of a reactive hydrogen containing material having a molecular weight of 700 to 4500 and preferably from about 1000 to 3500 is selected from the polyester amides, polyester polyols and the polyether polyols with about 30 to 120 parts of an organic polyisocyanate preferably in the presence of about 5 to 200 parts of an inert powdery filler and a polyurethane catalyst of the metallic type such as the salts of tin, mercury and lead and the tertiary amines, such as triethylene diamine, trimethyl piperazine and the other well known tertiary amines.

A representative prepolymer can be formed by mixing and reacting a thoroughly degassed mixture of 100 parts of polypropylene glycol of about 2000 molecular weight, 60 parts of a filler, such as silicates of talc and clay, calcium carbonate, whiting, carbon black, etc. with 50 to 70 parts of toluene diisocyanate or methane di(phenyl isocyanate) of monomeric or polymeric type depending on the percent free isocyanate desired. Usually the reaction time at elevated temperature is chosen to give a prepolymer in one to several hours. These prepolymers usually have from 3 to 15 percent of free NCO with 7 to 10 percent being preferred. Those of ordinary skill in this art appreciate other polyols such as polytetramethylene ether glycol, hydroxyl terminated butadiene or the related dienes and the copolymers of these dienes with monomers such as styrene or acrylonitrile can be used to make prepolymers useful in this invention. Likewise the polyester polyols such as the adipates, azelates, phthalates of the glycols or triols of ethylene, propylene, butylene, amylene, hexylene and higher can be used to make prepolymers useful in this invention.

The curative component is a mixture of a relatively low equivalent weight reactive hydrogen containing material which has been partially reacted with an organic polyisocyanate prior to the time the polyamine is added. The diamine preferably is one that reacts with the organic polyisocyanate, used to make the prepolymer, to yield a turbidity within 30 seconds in the hot methylene chloride test at about 0.5 semimolar concentration as described in U.S. Pat. No. 2,620,516.

Exemplary of these polyamines are the diamines, the triamines, tetramines and related polymeric amines where the polyamine contains 2, 3, 4 or more nitrogen atoms. Some specific examples of useful diamines are hydrazine, ethylene diamine, propylene diamine, butylene diamine, amylene diamine, hexylene diamine, toluene diamine, isophorone diamine and methane dianiline, to name a few of the well known materials.

In the preferred method of preparing the curative the reactive hydrogen containing material, the organic polyisocyanate and any filler used is mixed in the reactor and heated to about 60° C. for about one hour before a vacuum is applied. After three hours the diamine is added and the mixture is cooled to about 37° C. and thus is ready for use in preparing the adhesive. A preferred curative recipe is as follows:

| Ingredient | Parts |
| --- | --- |
| Tripropylene ether glycol | 288 |
| Polypropylene ether glycol, 2000 molecular weight | 1000 |
| Polypropylene ether triol, 3500 molecular weight | 1167 |
| Toluene diisocyanate | 222 |
| Talc filler | 2000 |
| Polypropylene tetraol 125 equivalent weight | 1125 |
| Ethylene diamine | 290 |

The first five ingredients of the above recipe were added to the reactor and mixed as the contents were heated to 60° C. for one hour. A vacuum was pulled on the reactor for three hours before the last two ingredients were added and the contents of the reactor cooled to 37° C. This curative had a low viscosity of about 50,000 centipoises as measured by the Brookfield Viscometer at 25° C. with #6 spindle at 10 rpm.

The prepolymer component and the curative component are mixed in a ratio of 1:2 to 2:1 to obtain the adhesive. These adhesives have good open times up to two hours but cure rapidly at 120° to 150° C. in 5 to 10 minutes. Also these adhesives will cure at room temperature in 10 to 20 hours. Thus the adhesives can be used to achieve energy saving yet the adhesive provides a bond that exhibits good temperature properties at 230° C. whereas the prior adhesive properties begin to fade as 200° C. is approached. These adhesive bonds in lap shear bond tests exhibit bond strengths in excess of 300 psi (2.0 MPa) with polyester fiberglass test specimens. Since the components are low in viscosity they are readily pumpable and mixed at 1:2 to 2:1 ratio to yield an adhesive that immediately, viz 2 to 3 minutes, exhibits pseudothixotropic properties without the need to use the normal urethane catalyst to get the desired gel time.

The nature and advantage of this invention can be more readily seen and appreciated by reference to the following represenatative examples where all parts and percentages are by weight unless otherwise indicated.

EXAMPLE 1

A prepolymer was made by adding 100 parts of polypropylene ether glycol of 2000 molecular weight in a reactor equipped with a heater, a stirrer and vacuum equipment. The polypropylene ether glycol was heated sufficiently to permit the stirrer to readily operate and sufficient vacuum was drawn to degas the stirred contents of the reactor. Then 31 parts of a polymeric methylene di(phenyl isocyanate) and 45 parts of flaked methylene di(phenyl isocyanate) along with 46 parts of talc were added to the reactor. The isocyanate was reacted until the free NCO content of the prepolymer was 9.2 percent by weight. This prepolymer had a Brookfield viscosity as measured at 25° C. and at a speed of 10 rpm with a #6 spindle of 35,000 centipoises. This prepolymer could be mixed with curatives, preferably at 1:1 ratio although in some cases ratios of 2:1 and higher can be used to advantage in preparation of the adhesives.

EXAMPLE 2

A curative was prepared by charging 116.7 parts of polypropylene ether glycol of 3000 molecular weight, 20 parts polypropylene tetraol of 125 gram/equivalent weight and 85 parts of talc to a reactor equipped with a heater, stirrer and vacuum apparatus. The contents of the reactor were heated and stirred under a vacuum to degas the mass. Then 70 parts of polyaryl methane polyisocyanate was added and reacted before 2.0 parts of ethylene diamine was added and thoroughly mixed with the contents of the reactor.

This curative had a Brookfield viscosity as measured at 25° C. and at a speed of 10 rpm with a #6 spindle of 55,000 centipoises.

EXAMPLE 3

The prepolymer component of Example 1 was mixed with the curative component of Example 2 at ratios of 1:1 and 2:1 to give adhesives that functioned satisfactorily to adhere polyester impregnated fiberglass panels together and had satisfactory sag properties for use in commercial operations. Also the open time was about 120 minutes.

Typical bond strength at bond failure on cross bonded laminated substances at room temperature was as follows:

Cold roll steel, phenolic resin primed substrates, 750 psi (5.17 MPa)—Cohesive failure Standard SMC specimen (polyester fiberglass impregnated), 300–500 psi (2.0–3.4 MPa) Cohesive and substrate failure.

Instead of ethylene diamine other polyamines such as propylene diamine, hydrazine, butylene diamine, isophorone diamine, toluene diamine and methane dianiline may be used satisfactorily in the above recipes. Also the other organic polyisocyanates may be used.

While certain representative embodiments and details have been shown for the purpose of illustrating the invention it will be apparent to those skilled in this art that various changes and modifications may be made therein without departing from the spirit or scope of the invention.

We claim:

1. A two component adhesive composed of a polyurethane component containing 3 to 15 percent by weight of free NCO and a curative component composed of a mixture of 0.01 to 0.1 equivalents of a polyamine having a molecular weight less than about 1000 and 0.1 to 1.0 equivalent of a hydroxyl terminated prepolymer formed by reacting 0.1 to 1.5 equivalents of a 150 to 3000 molecular weight polyol having 2 to 6 hydroxyls with 0.1 to 0.4 equivalents of an organic polyisocyanate.

2. The adhesive of claim 1 having the characteristics, when the components are mixed in ratios of 1:2 to 2:1 of being sag resistant immediately after mixing and exhibiting a gel time of at least 2 to 120 minutes at 24° C.

3. The adhesive of claim 1 wherein the polyamine is a diamine.

4. The adhesive of claim 1 wherein the organic isocyanate is selected from the class consisting of toluene diisocyanate, monomeric and/or polymeric methylene di(phenyl isocyanate) and isophorone diisocyanate.

5. The adhesive of claim 4 wherein the polyamine is a diamine.

6. The adhesive of claim 5 wherein the diamine is ethylene diamine.

7. The adhesive of claim 1 wherein the hydroxyl terminated prepolymer of the curative is a reaction product of an organic polyisocyanate with a blend of polypropylene ether glycol with a polyol having 3 to 6 hydroxyls.

8. The adhesive of claim 1 wherein the organic polyisocyanate is selected from the class consisting of toluene diisocyanate and monomeric or polymeric methylene di(phenyl isocyanate).

9. The adhesive of claim 8 wherein the organic polyisocyanate is selected from the class consisting of toluene diisocyanate, polyaryl methane polyisocyanate and monomeric or polymeric methane di(phenyl isocyanate).

10. A curative for a two component adhesive composed of a mixture of 0.01 to 0.1 equivalents of a polyamine having a molecular weight less than about 1000 and 0.1 to 1.0 equivalents of a hydroxyl terminated prepolymer resulting from reacting of 0.1 to 1.5 equivalents of a 150 to 3000 molecular weight polyol having 2 to 6 hydroxyls with 0.1 to 0.4 equivalents of an organic polyisocyanate.

11. The curative of claim 10 wherein the hydroxyl terminated prepolymer is a reaction product of an organic polyisocyanate with a blend of two polyols.

* * * * *